United States Patent
Huang-Fu et al.

(10) Patent No.: US 11,706,665 B2
(45) Date of Patent: Jul. 18, 2023

(54) ENHANCED HANDLING ON 5G QOS OPERATIONS

(71) Applicant: MEDIATEK INC., Hsin-Chu (TW)

(72) Inventors: Chien-Chun Huang-Fu, Hsin-Chu (TW); Po-Ying Chuang, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 17/316,909

(22) Filed: May 11, 2021

(65) Prior Publication Data

US 2021/0266794 A1 Aug. 26, 2021

Related U.S. Application Data

(63) Continuation of application No. 16/458,523, filed on Jul. 1, 2019, now Pat. No. 11,026,124.

(60) Provisional application No. 62/693,208, filed on Jul. 2, 2018.

(51) Int. Cl.
*H04W 28/24* (2009.01)
*H04L 67/14* (2022.01)
*H04W 84/04* (2009.01)

(52) U.S. Cl.
CPC ............ *H04W 28/24* (2013.01); *H04L 67/14* (2013.01); *H04W 84/042* (2013.01)

(58) Field of Classification Search
CPC .... H04W 28/24; H04W 84/042; H04L 67/14; H04L 43/08; H04L 41/00
See application file for complete search history.

(56) References Cited

U.S. PATENT DOCUMENTS

| | | | |
|---|---|---|---|
| 2005/0080754 A1 | 4/2005 | Kashiwabara et al. | |
| 2008/0195511 A1 | 8/2008 | Zhang | 705/30 |
| 2010/0217855 A1 | 8/2010 | Przybsysz et al. | 709/223 |

(Continued)

FOREIGN PATENT DOCUMENTS

| | | |
|---|---|---|
| CN | 106332187 A | 6/2015 |
| CN | 107580371 A | 7/2016 |

(Continued)

OTHER PUBLICATIONS

Huawei, C1-183724, "5GSM congestion control over AMF for PDU session modification", May 25, 2018, 3GPP.*

(Continued)

*Primary Examiner* — Jae Y Lee
(74) *Attorney, Agent, or Firm* — Imperium Patent Works; zheng jin

(57) ABSTRACT

A method of enhanced error handling for 5G QoS operations is proposed. A PDU session defines the association between the UE and the data network that provides a PDU connectivity service. Each PDU session is identified by a PDU session ID, and may include multiple QoS flows and QoS rules. Within a PDU session, there should be one and only one default QoS rule. The default QoS rule indication (DQR) and the QoS flow identifier (QFI) of a signaled QoS rule should not be changed. Two new 5G session management (5GSM) causes are defined: a semantic error in the QoS operation (cause value #83) and a syntactic error (cause value #84) in the QoS operation. The UE should check the QoS rule provided in a PDU session modification command message for different types of QoS rule errors.

10 Claims, 4 Drawing Sheets

(56) References Cited

U.S. PATENT DOCUMENTS

| | | |
|---|---|---|
| 2011/0310737 A1 | 12/2011 | Klingenbrunn ... H04W 36/0044 |
| 2012/0147767 A1 | 6/2012 | Yang et al. .................... 370/252 |
| 2012/0196566 A1 | 8/2012 | Lee et al. ....................... 455/408 |
| 2013/0044592 A1 | 2/2013 | Kim et al. ..................... 370/229 |
| 2016/0119773 A1 | 4/2016 | Xu et al. ..................... 455/432.2 |
| 2016/0212792 A1 | 7/2016 | Chang .................... H04W 76/22 |
| 2017/0006494 A1 | 1/2017 | Wang et al. .................. 370/236 |
| 2017/0289046 A1 | 10/2017 | Faccin et al. |
| 2018/0048537 A1 | 2/2018 | Galkwad et al. ....... H04L 12/24 |
| 2018/0070288 A1 | 3/2018 | Kim et al. |
| 2018/0198867 A1 | 7/2018 | Dao et al. |
| 2018/0234876 A1 | 8/2018 | Jheng et al. |
| 2018/0270695 A1 | 9/2018 | Bergstrom et al. |
| 2018/0376445 A1 | 12/2018 | Yoon et al. |
| 2019/0116518 A1 | 4/2019 | Stojanovski et al. |
| 2019/0159059 A1 | 5/2019 | Jheng et al. |
| 2019/0200264 A1 | 6/2019 | Kim et al. |
| 2019/0239280 A1 | 8/2019 | Li et al. |
| 2019/0253917 A1 | 8/2019 | Dao |
| 2019/0254118 A1 | 8/2019 | Dao et al. |
| 2019/0261211 A1 | 8/2019 | Wu et al. |
| 2019/0349803 A1 | 11/2019 | Byun et al. |
| 2019/0357118 A1 | 11/2019 | Kim et al. |
| 2019/0357129 A1 | 11/2019 | Park et al. |
| 2019/0394830 A1 | 12/2019 | Mildh et al. .......... H04W 76/38 |
| 2020/0037197 A1 | 1/2020 | Cho et al. |
| 2020/0037386 A1 | 1/2020 | Park et al. |
| 2020/0077315 A1 | 3/2020 | Jin et al. |
| 2020/0100147 A1 | 3/2020 | Youn et al. |
| 2020/0145884 A1 | 5/2020 | Guo |
| 2020/0187043 A1 | 6/2020 | Xin et al. |
| 2020/0260336 A1 | 8/2020 | Wu et al. |
| 2020/0275302 A1 | 8/2020 | Youn ................ H04W 28/0268 |
| 2020/0280562 A1 | 9/2020 | Salkintzis |
| 2020/0374352 A1 | 11/2020 | Ge et al. ................. H04L 29/08 |
| 2021/0022099 A1 | 1/2021 | Kumar et al. ........ H04W 60/04 |
| 2021/0014157 A1 | 2/2021 | Zhou ..................... H04L 12/725 |

FOREIGN PATENT DOCUMENTS

| | | |
|---|---|---|
| CN | 107690161 A | 8/2016 |
| CN | 107018542 A | 3/2017 |
| WO | WO2018059689 A1 | 9/2016 |

OTHER PUBLICATIONS

Huawei, C1-182457, Encoding of Match all Packet filter, Apr. 20, 2018, 3GPP.*

Sharp, 3GPP C1-183329, "5GSM capability in PDU session modification procedure", May 25, 2018, 3GPP.*

USPTO, office action for related U.S. Appl. No. 16/366,106 dated Sep. 16, 2020 (13 pages).

U.S. Appl. No. 16/366,106 OA reference S2-173269 SA WG2 Meeting #S2-121, Samsung, "TS 23.502—Update General Registration", Hangzhou, China, May 15-19, 2017 (6 pages).

USPTO, office action for related U.S. Appl. No. 16/366,125 dated Oct. 19, 2020 (18 pages).

USPTO, office action for related U.S. Appl. No. 16/525,852 dated Sep. 28, 2020 (19 pages).

U.S. Appl. No. 16/525,852 OA reference C1-183815, 3GPP TSG-CT WG1 Meeting #111, Ericsson et al., "5G QoS—restructuring QoS rules IE", Osaka, Japan, May 21-25, 2018 (25 pages).

Taiwan IPO, office action for the TW patent application 108110864 (no English translation is available) dated Jun. 22, 2020 (9 pages).

3GPP TS 24.501 V1.0.0 (Mar. 2018) 3rd Generation Partnership project; Technical Specification Group Core Network and Terminals; Non-Access-Stratum(NAS) protocol for 5G System (5GS); Stage 3 (Release 15), *section 5.4.4.3, 6.2.3, 6.2.5.1.1.2, 6.4.1.1, 6.4.1.2, 6.4.1.3, 6.4.3.2*.

S2-180421 SA WG2 Meeting #S2-125, Ericsson, "Default QoS Rule discussion", Gothenburg, Sweden, Jan. 22-26, 2018 (4 pages) *section 1, 2.1*.

Taiwan IPO, office action for the TW patent application 108127877 (no English translation is available) dated May 8, 2020 (6 pages).

C1-184425 3GPP TSG-CT WG1 Meeting #111 bis, MediaTek Inc., "Exception handling in QoS operation", Sophia-Antipolis, France, Jul. 9-13, 2018 (8 pages) *pp. 1-5*.

C1-184614 3GPP TSG-CT WG1 Meeting #111 bis, MediaTek Inc., "Exception handling in QoS operation", Sophia-Antipolis, France, Jul. 9-13, 2018 (7 pages).

USPTO, Notice of allowance for parent U.S. Appl. No. 16/458,523 dated Feb. 4, 2021.

USPTO, Office Action for related U.S. Appl. No. 16/366,125 dated Jun. 10, 2021.

Qualcomm, C1-185828 "PDU Session Release due to Semantic or Syntactical Errors", Aug. 20, 2018, 3GPP.

3GPP TS 24.501 v 15.1.0 (Sep. 2018).

3GPP TS 23.501 v.1.0.0 (Jun. 2017).

USPTO, office action for the related U.S. Appl. No. 16/366,125 dated Apr. 2, 2020 (16 pages).

3GPP TS 24.501 V0.2.2 (Dec. 2017), 3rd Generation Partnership Project; Technical Specification Group Core Network and Terminals; Non-Access-Stratum (NAS) protocol for 5G System (5GS); State 3 (Release 15) *p. 2, 84-88, and 128-138*.

International Search Report and Written Opinion of International Search Authority for PCT/CN2019/081864 dated Jul. 1, 2019 (9 pages).

3GPP TR 24.890 V15.1.0 (Mar. 2018), 3rd Generation Partnership Project; Technical Specification Group Core Network and Terminals; 5G System—Phase 1; CT WG1 Aspects, (Release 15) *section 9.5.6, sections 12.4*.

S2-175526 SA WG2 Meeting #122 BIS, Samsung, "update on PDU session handling for AS and NAS QoS", Sophia Antipolis, France, Aug. 21-25, 2017 (11 pages).

S2-177432 SA WG2 Meeting #S2-123, Samsung, "TS 23.501: PDU session reachability management", Ljubljana, Slovenia, Oct. 23-27, 2017 (7 pages).

International Search Report and Written Opinion of International Search Authority for PCT/CN2019/081866 dated Jun. 27, 2019 (9 pages).

3GPP TS 24.501 V0.2.2 (Dec. 2017), 3rd Generation Partnership Project; Technical Specification Group Core Network and Terminals; Non-Access-Stratum (NAS) protocol for 5G System (5GS); State 3 (Release 15) *sections 6.2.5, sections 8.3*.

International Search Report and Written Opinion of International Search Authority for PCT/CN2019/094339 dated Sep. 27, 2019 (10 pages).

C1-184614 3GPP TSG-CT WG1 Meeting #11 bis, MediaTek Inc., "Exception handling in QoS operation", Sophia-Antipolis, France, Jul. 9-13, 2018 (7 pages) *sections 6.3.2.4*.

C1-182457 3GPP TSG-CT WG1 Meeting #110, Huawei et al., "Encoding of Match All Packet Filter", Kunming, P.R. of China, Apr. 16-20, 2018 (12 pages) *sections 6.2.5.1.1*, *sections 9.8.4.7*.

Taiwan IPO, office action for related TW patent application 108110866 (no English translation is available) dated Mar. 23, 2020 (10 pages).

3GPP TR 24.890, "3rd Generation Partnership Project; Technical Specification Group Core Network and Terminals;; 5G System— Phase 1; CT WG1 Aspects (Release 15)," V15.1.0, Mar. 2018 *sections 9.5.3.2, 9.5.5.2, 9.5.6.2, 9.5.6.4, 12.4.1.1.2, Fig. 9.5.5.2.1, Fig. 9.5.6.2.1*.

3GPP SA WG2 Meeting #124 (S2-178255), Nokia et al., "OI #18 23.502;"(NAS SM; split) + Correcting information flows in § 4. (PDU session related), Reno, NV. USA, Nov. 27-Dec. 1, 2017 *sections 4.3.3.2, Fig. 4.3.3.2-1*.

3GPP TS 23.502, "3rd Generation Partnership Project; Technical Specification Group Services and System Aspects; Procedures for the 5G System; Stage 2 (Release 15)", V15.1.0, Mar. 2018 *section 4.3.3.2*.

USPTO, notice of allowance for related U.S. Appl. No. 16/525,852 dated Feb. 24, 2021 (12 pages).

China IPO office action and written opinion for application 201980002126.3, dated Mar. 13, 2023, 8 pages.

(56) References Cited

OTHER PUBLICATIONS

C1-183724, 5GSM congestion control over AMF for PDU session modification, Huawei, 3GPP TSG-CT WG1 Meeting #111, May 28, 2018.
C1-182457, Encoding of Match-all Packet filter, Huawei, 3GPP TSG-CT WG1 Meeting #110, Apr. 20, 2018.

* cited by examiner

ENHANCED HANDLING ON 5G QOS OPERATIONS

CROSS REFERENCE TO RELATED APPLICATIONS

This application is a continuation, and claims priority under 35 U.S.C. § 120 from nonprovisional U.S. patent application Ser. No. 16/458,523, entitled "Enhanced Handling on 5G QoS Operations", filed on Jul. 1, 2019, the subject matter of which is incorporated herein by reference. Application Ser. No. 16/458,523, in turn, claims priority under 35 U.S.C. § 119 from U.S. Provisional Application No. 62/693,208, entitled "Enhanced Handling on 5G QoS Operations", filed on Jul. 2, 2018, the subject matter of which is incorporated herein by reference.

TECHNICAL FIELD

The disclosed embodiments relate generally to wireless communication, and, more particularly, to method of handling Quality of Service (QoS) operations in 5G new radio (NR) systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G new radio (NR) systems.

Quality of Service (QoS) indicates the performance from the perspective of network users. In LTE Evolved Packet System (EPS), QoS is managed based on EPS bearer in the Evolved Packet Core (EPC) and the Radio Access Network (RAN). In 5G network, QoS flow is the finest granularity for QoS management to enable more flexible QoS control. The concept of QoS flow is like EPS bearer. All types of traffic mapped to the same LTE EPS bearer or to the same 5G QoS flow receive the same level of packet forwarding treatment (e.g., scheduling policy, queue management policy, rate shaping policy, RLC configuration etc.) Providing different QoS forwarding treatment requires separate 5G QoS flow. Each QoS flow may include multiple QoS rules consisting of QoS profile, packet filters, and precedence order. QoS profile includes QoS parameters and QoS marking. Packet filter is used for binding a QoS flow to a specific QoS marking. Precedence order represents the priority to adapt a QoS rule to a QoS flow. UE performs the classification and marking of uplink (UL) User Plane traffic, i.e., the association of UL traffic to QoS flows based on QoS rules.

In 5G, PDU session establishment is a parallel procedure of PDN connection procedure in 4G. A PDU session defines the association between the UE and the data network that provides a PDU connectivity service. Each PDU session is identified by a PDU session ID, and may include multiple QoS flows and QoS rules. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. Within a PDU session, there should be one and only one default QoS rule. For additional details of the default QoS rule, please refer to patent application Ser. No. 16/366,106 filed on Mar. 27, 2019, and patent application Ser. No. 16/366,125 filed on Mar. 27, 2019, the subject of which is incorporated by reference.

In the current 5G non-access stratum (NAS) specification, based on QoS rule operation codes defined in the QoS rule IE, the allowed operation include: 1) create new QoS rule; 2) delete existing QoS rule; 3) modify existing QoS rule and add packet filters; 4) modify existing QoS rule and replace packet filters; 5) modify existing QoS rules and delete packet filters; and 6) modify existing QoS rule without modifying packet filters. As a result, the network may send multiple QoS rules to UE as the default QoS rule, the network may want to delete the default QoS rule, and the network may want to modify the default QoS rule. In addition, the exception handling in QoS rule operation is not defined. It is thus desirable to define the UE behavior and error handling for proper QoS rule management.

SUMMARY

A method of enhanced error handling for 5G QoS operations is proposed. A PDU session defines the association between the UE and the data network that provides a PDU connectivity service. Each PDU session is identified by a PDU session ID, and may include multiple QoS flows and QoS rules. Within a PDU session, there should be one and only one default QoS rule. The default QoS rule indication (DQR) and the QoS flow identifier (QFI) of a signaled QoS rule should not be changed. Two new 5G session management (5GSM) causes are defined: a semantic error in the QoS operation (cause value #83) and a syntactic error (cause value #84) in the QoS operation. The UE should check the QoS rule provided in a PDU session modification command message for different types of QoS rule errors.

In one embodiment, a UE receives a Quality of Service (QoS) rule in a mobile communication network for performing a QoS operation associated with a protocol data unit (PDU) session. The UE determines that the QoS rule has an identical precedence value with an existing QoS rule associated with the same PDU session. The UE detects whether the existing QoS rule is a default QoS rule of the PDU session. If a detecting result is negative, then the UE deletes the existing QoS rule when the QoS operation is processed successfully. If the detecting result is positive, then the UE releases the PDU session.

In another embodiment, a UE establishes a protocol data unit (PDU) session in a mobile communication network. The UE receives a PDU session modification command message from the network. The command message carries a Quality of Service (QoS) rule for performing a QoS operation associated with the PDU session. The UE determines whether the command message causes a syntactical error in the QoS operation. The UE rejects the PDU session modification command message upon determining the syntactical error. The syntactical error occurs when the QoS operation is a categorized operation as well as the QoS operation meets one of the following situations: an empty packet filter list is in the QoS rule, a non-empty packet filter list is in the QoS rule, and a packet filter to be deleted does not exist in the existing QoS rule.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
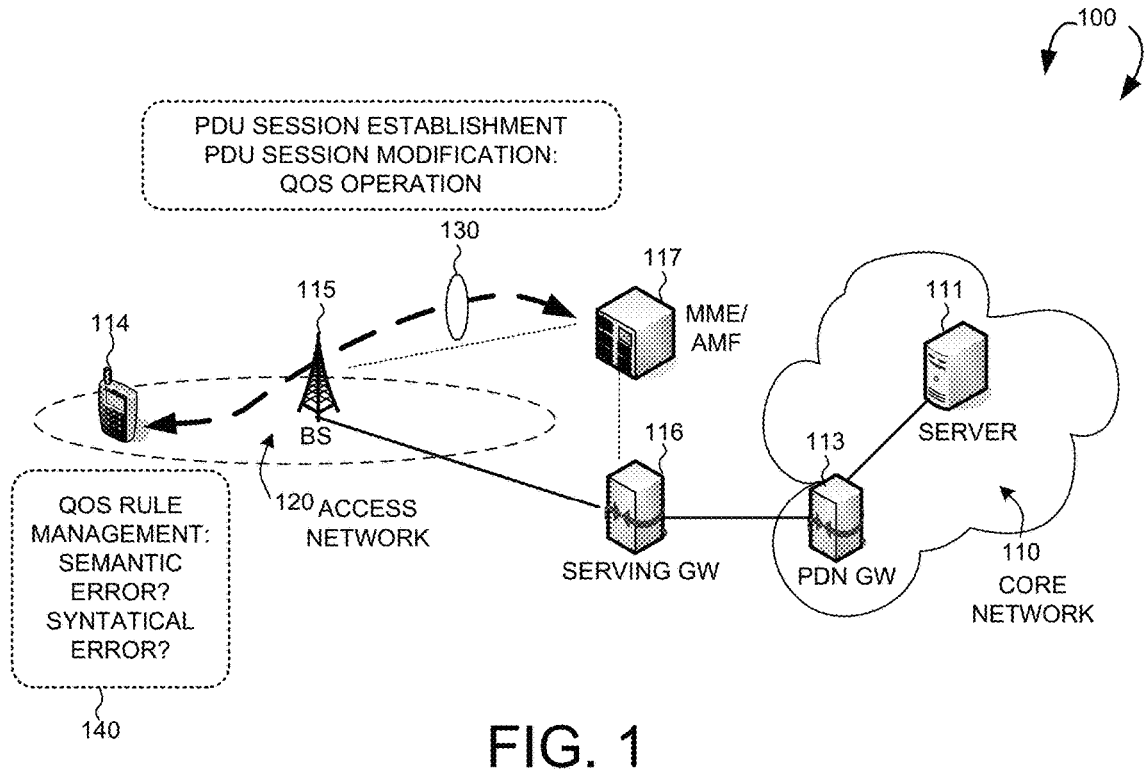
FIG. 1 illustrates an exemplary EPS/5GS network supporting Quality of Service (QoS) rule management in accordance with one novel aspect.

FIG. 1 illustrates an exemplary 4G LTE or 5G new radio (NR) 100 network supporting Quality of Service (QoS) rule management in accordance with one novel aspect. LTE/NR network 100 comprises application server 111 that provides various services by communicating with a plurality of user equipments (UEs) including UE 114. In the example of FIG. 1, application server 111 and a packet data network gateway (PDN GW or P-GW) 113 belong to part of a core network CN 110. UE 114 and its serving base station BS 115 belong to part of a radio access network RAN 120. RAN 120 provides radio access for UE 114 via a radio access technology (RAT). Application server 111 communicates with UE 114 through PDN GW 113, serving GW 116, and BS 115. A mobility management entity (MME) or an access and mobility management function (AMF) 117 communicates with BS 115, serving GW 116 and PDN GW 113 for access and mobility management of wireless access devices in LTE/NR network 100. UE 114 may be equipped with a radio frequency (RF) transceiver or multiple RF transceivers for different application services via different RATs/CNs. UE 114 may be a smart phone, a wearable device, an Internet of Things (IoT) device, and a tablet, etc.

EPS and 5GS networks are packet-switched (PS) Internet Protocol (IP) networks. This means that the networks deliver all data traffic in IP packets, and provide users with Always-On IP Connectivity. When UE joins an EPS/5GS network, a Packet Data Network (PDN) address (i.e., the one that can be used on the PDN) is assigned to the UE for its connection to the PDN. EPS calls the UE's "IP access connection" an evolved packet system (EPS) bearer, which is a connection between the UE and the P-GW. The P-GW is the default gateway for the UE's IP access. EPS has defined a Default EPS Bearer to provide the IP Connectivity that is Always-On.

In 5G, PDU session establishment is a parallel procedure of PDN connection procedure in 4G. A PDU session defines the association between the UE and the data network that provides a PDU connectivity service. Each PDU session is identified by a PDU session ID, and may include multiple QoS flows and QoS rules. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. Within a PDU session, there should be one and only one default QoS rule.

In the current 5G non-access stratum (NAS) specification, based on QoS rule operation codes defined in the QoS rule IE, the allowed many different QoS rule operations including create, modify, and delete QoS rule and packet filters via PDU session establishment and modification procedures. In accordance with one novel aspect, UE behavior and error handling are defined for QoS rule operations via PDU session establishment and modification procedures. The default QoS rule indication (DQR) and the QoS flow identifier (QFI) of a signaled QoS rule should not be changed. The UE should check the QoS rule provided in the PDU session modification command message for different types of QoS rule errors. Two new 5G session management (5GSM) causes are defined for QoS rule errors: a semantic error in the QoS operation (cause #83) and a syntactic error (cause #84) in the QoS operation. In the example of FIG. 1, UE 114 establishes a PDU session and performs a QoS operation via a PDU session modification procedure with the network over non-access stratum (NAS) layer signaling 130. Upon receiving the QoS rule, UE 114 performs QoS rule management as depicted by 140. In a first example, UE 114 rejects a PDU session modification command or releases the PDU session upon detecting a semantic error of the QoS operation. In a second example, UE 114 rejects a PDU session modification command upon detecting a syntactical error of the QoS operation.

Figure 2:
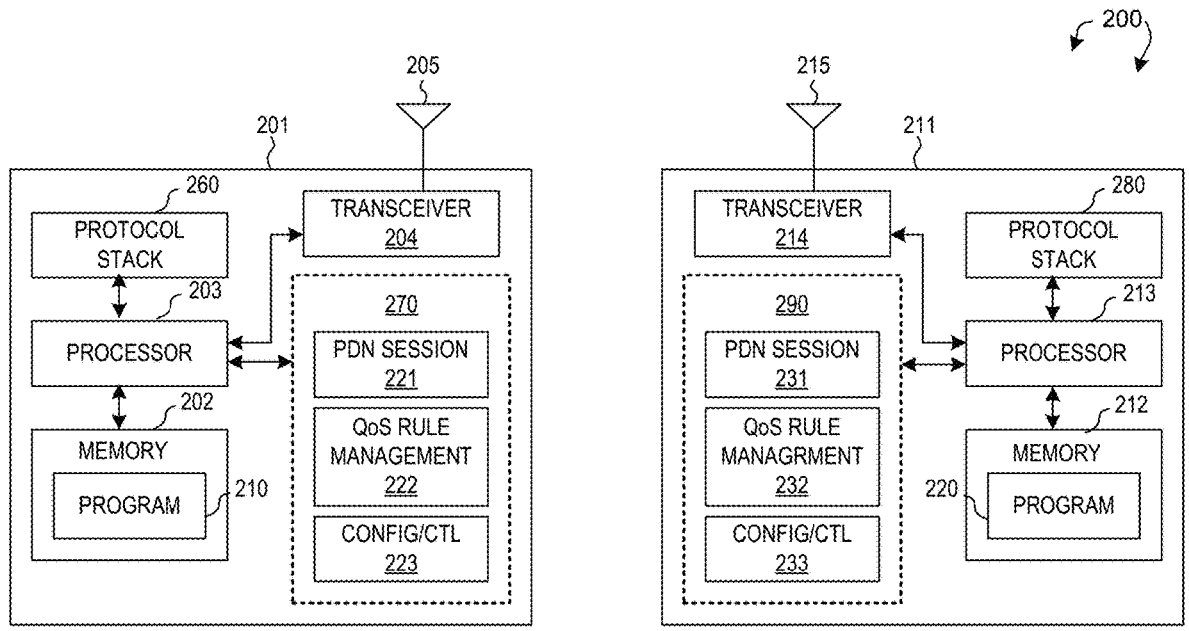
FIG. 2 illustrates simplified block diagrams of a user equipment (UE) in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. PDU session handling circuit 231 handles PDU session establishment and modification procedures. QoS flow and rule management circuit 232 creates, modifies, and deletes QoS flows and QoS rules for UE. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session handling circuit 221 that performs PDU session establishment and modification procedures with the network, a QoS rule management circuit 222 that determines any conflict of the default QoS rules and handles QoS rule management by detecting semantic error and syntactical error, a config and control circuit 223 that handles configuration and control parameters.

A command message from the network carries a new QoS rule (for create new QoS rule) or QoS rule parameters and/or packet filter parameters (for modify QoS rule). One of the QoS rule parameters is a precedence value, which defines the priority of the QoS rule for the PDU session. Within each PDU session, different QoS rules thus should have different precedence values. When the QoS operations carried by the command messages comprise at least one of the categorized operations: "Create new QoS rule", "Modify existing QoS rule and add packet filters", "Modify existing QoS rule and replace all packet filters", "Modify existing QoS rule and delete packet filters", or "Modify existing QoS rule without modifying packet filters", as well as this incoming new QoS rule has the same precedence value with an existing QoS rule for the same PDU session, then it is defined as a semantic error in QoS operations. The QoS rule can be received via a PDU session modification procedure, a PDU session establishment procedure, or an ESM procedure.

Figure 3:
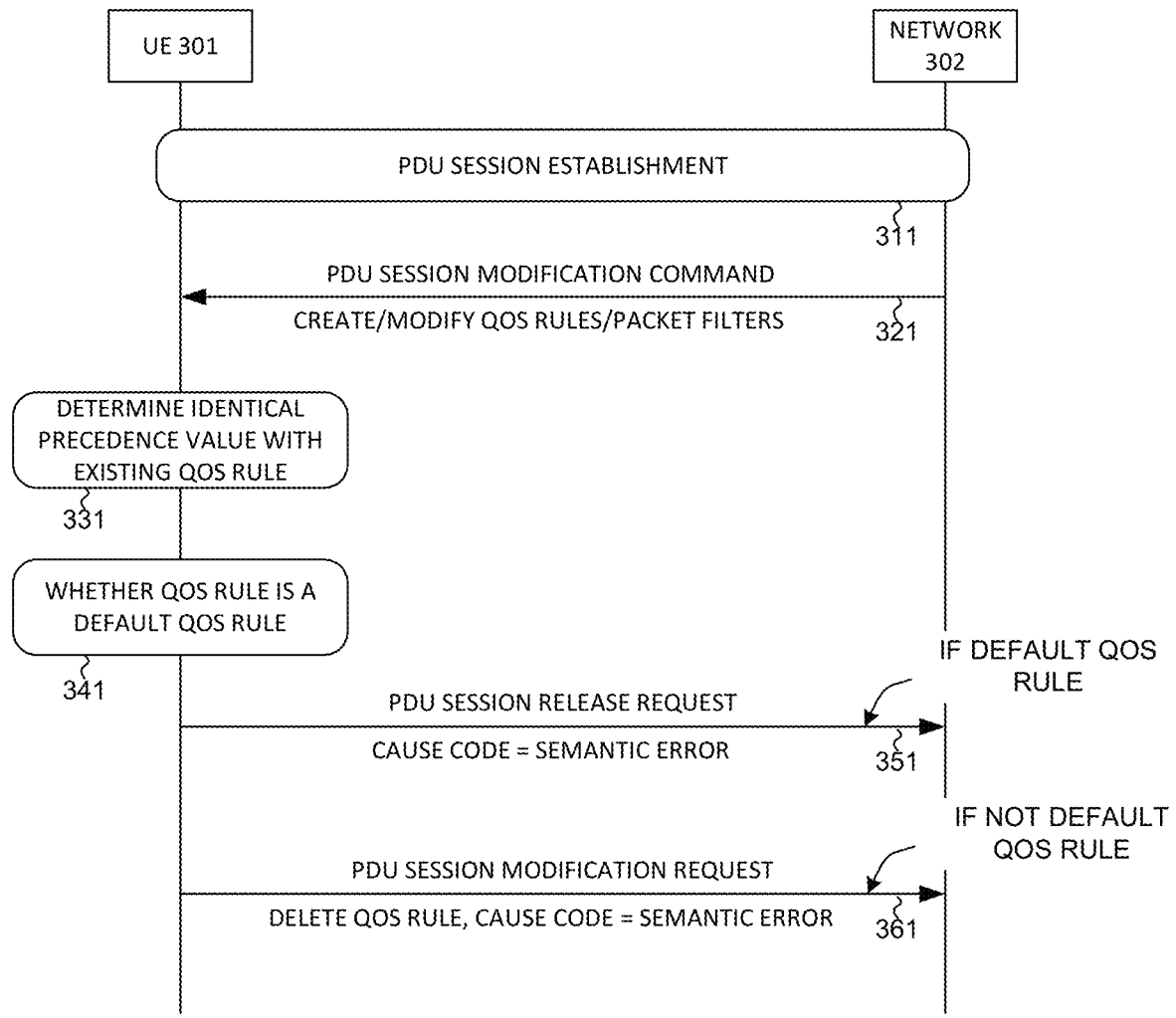
FIG. 3 illustrates one embodiment of QoS rule operation with semantic error for PDU session modification procedure in accordance with one novel aspect.

FIG. 3 illustrates one embodiment of QoS rule operation with semantic error for PDU session modification procedure in accordance with one novel aspect. In step 311, UE 301 and network 302 establish a PDU session via a PDU session establishment procedure. The PDU session may be established to comprise one or more QoS rules, including one default QoS rule. In step 321, network 302 sends a PDU session modification command message to UE 301. The command message is for UE to perform certain QoS rule operations. In step 331, UE 302 determines whether the QoS operation would result in two or more QoS rules associated with the same PDU session having identical precedence values. That is, the newly created QoS rule or the modified QoS rule has the same precedence value as an existing QoS rule of the PDU session. If so, then a semantic error occurs, because each QoS rule should have a unique precedence value within the same PDU session. In step 341, UE 301 further detects whether the existing QoS rule is default QoS rule.

If the detecting result in Step 341 is positive, that means the existing QoS rule is a default QoS rule, then such semantic error causes problem with the default QoS rule of the PDU session. As a result, the PDU session should be released. In step 351, UE 301 initiates a PDU session release procedure by sending a PDU session release request message to network 302. The request message carries a 5GSM cause value #83 indicating "semantic error in the QoS operation". If the detecting result is negative in Step 341, that means the existing QoS rule is not a default QoS rule, then UE shall not diagnose an error and process the QoS operation, as long as the existing QoS rule can be deleted and the network is informed. In step 361, UE 301 processes the QoS operation. If the QoS operation was processed successfully, then UE 301 deletes the existing QoS rule having the identical precedence value by sending a PDU session modification request message to network 302. The request message carries a 5GSM cause value #83 indicating "semantic error in the QoS operation". On the other hand, if the QoS operation was processed unsuccessfully, rather than deleting the existing QoS rule, UE 301 rejects the PDU session modification command message with the 5GSM cause value #83 indicating "semantic error in the QoS operation".

In one alternative embodiment, the QoS rule is received by the UE via a modify EPS bearer context request message for the UE to perform the QoS operation. Upon detecting that the QoS rule is the default QoS rule, the UE sends a modify EPS bearer context accept message. But the message includes a protocol configuration options IE or an extended protocol configuration options IE that carries a 5GSM cause value #83 indicating "semantic error in the QoS operation".

Figure 4:
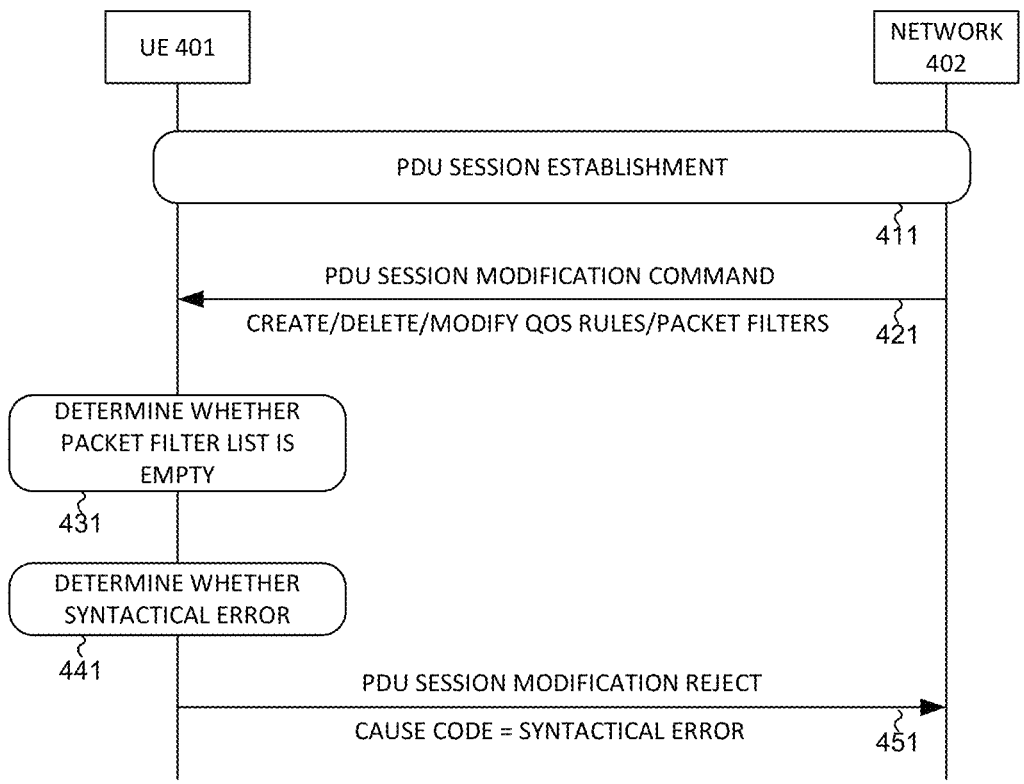
FIG. 4 illustrates a first embodiment of QoS rule operation with syntactical error for PDU session modification procedure in accordance with one novel aspect.

FIG. 4 illustrates a first embodiment of QoS rule operation with syntactical error for PDU session modification procedure in accordance with one novel aspect. In step 411, UE 401 and network 402 establish a PDU session via a PDU session establishment procedure. The PDU session may be established to comprise one or more QoS rules, including one default QoS rule. In step 421, network 402 sends a PDU session modification command message to UE 401. The command message is for UE to perform certain QoS rule operations. The QoS operations may be "Modify existing QoS rule and add packet filters", "Modify existing QoS rule and replace packet filters", or "Modify existing QoS rule and delete packet filters". These QoS operations intend to modify existing QoS rule by adding, replacing, or deleting certain packet filters of the QoS rule. Therefore, the command message needs to identify the to-be-modified QoS rule and packet filter list in order for UE to process the QoS operation.

Specifically, the command message needs to identify the QoS rule and the packet filter list that need to be added, replaced, or deleted. If the QoS rule has an empty packet filter list, then UE does not know what to do with the command. Such QoS operation thus cannot be performed by the UE due to the syntactical error. In step 431, UE 401 checks whether the packet filter list of the to-be-modified QoS rule is empty. In step 441, UE 401 determines a syntactic error occurs because the packet filter list of the to-be-modified QoS rule is empty. In step 451, UE 401 rejects the PDU session modification command message by sending a PDU session modification reject message to network 402. The PDU session modification reject message also carries a cause value #84 indicating "syntactical error in the QoS operation".

Figure 5:
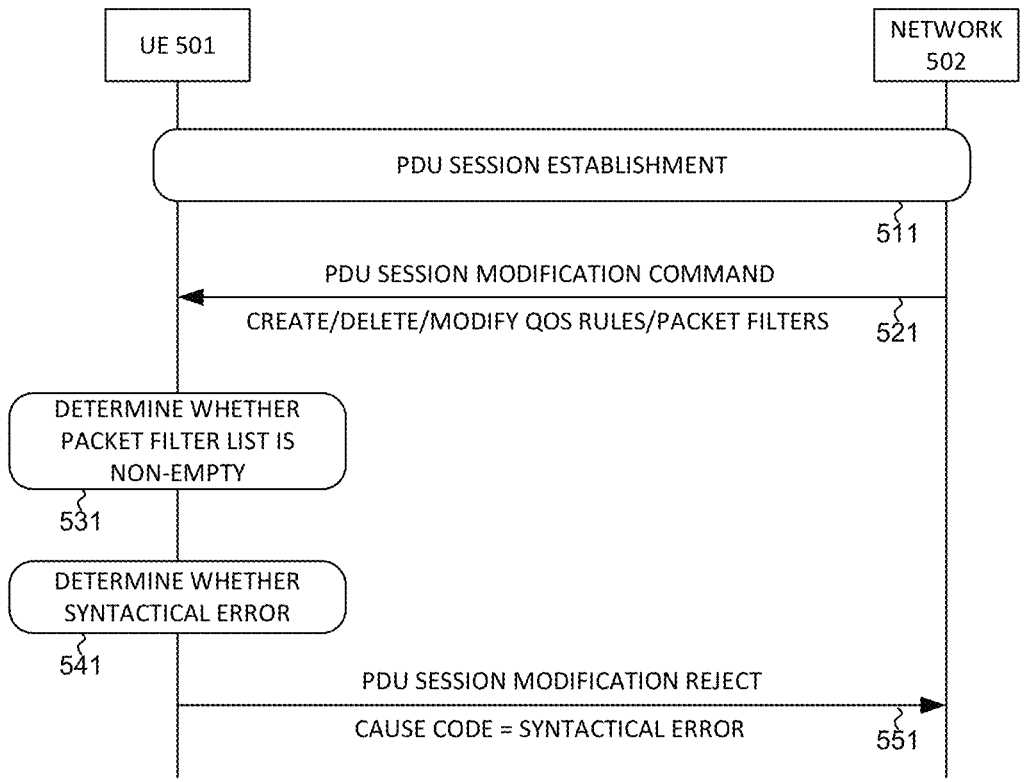
FIG. 5 illustrates a second embodiment of QoS rule operation with syntactical error for PDU session modification procedure in accordance with one novel aspect.

FIG. 5 illustrates a second embodiment of QoS rule operation with syntactical error for PDU session modification procedure in accordance with one novel aspect. In step 511, UE 501 and network 502 establish a PDU session via a PDU session establishment procedure. The PDU session may be established to comprise one or more QoS rules, including one default QoS rule. In step 521, network 502 sends a PDU session modification command message to UE 501. The command message is for UE to perform certain QoS rule operations. The QoS operations may be "Delete existing QoS rule", or "Modify existing QoS rule without modifying packet filters". These QoS operations intend to delete existing QoS rule or modify existing QoS rule without modifying any packet filters.

Therefore, the command message needs to identify the QoS rule, but should not provide any packet filter list. If the QoS rule has a non-empty packet filter list, then UE does not know what to do with the packet filter list. Such QoS operation cannot be performed by the UE due to the syntactical error. In step 531, UE 501 checks whether the packet filter list of the to-be-deleted or modified QoS rule is empty. In step 541, UE 501 determines a syntactic error occurs because the packet filter list of the to-be-deleted or modified QoS rule is not empty. In step 551, UE 501 rejects the PDU session modification command message by sending a PDU session modification reject message to network 502. The PDU session modification reject message also carries a cause value #84 indicating "syntactical error in the QoS operation".

In another embodiment, in step 521, the PDU session modification command message may request the UE 501 to perform a QoS operation of "Modify existing QoS rule and delete packet filters". Specifically, UE 501 is requested to modify a QoS rule by deleting certain packet filters of the QoS rule. However, in step 531, UE 501 may detect that the to-be-deleted packet filters do not exist in the to-be-modified QoS rule. In this case, UE 501 should not diagnose an error, and further process the deletion request and consider the to-be-deleted packet filter as being successfully deleted.

Figure 6:
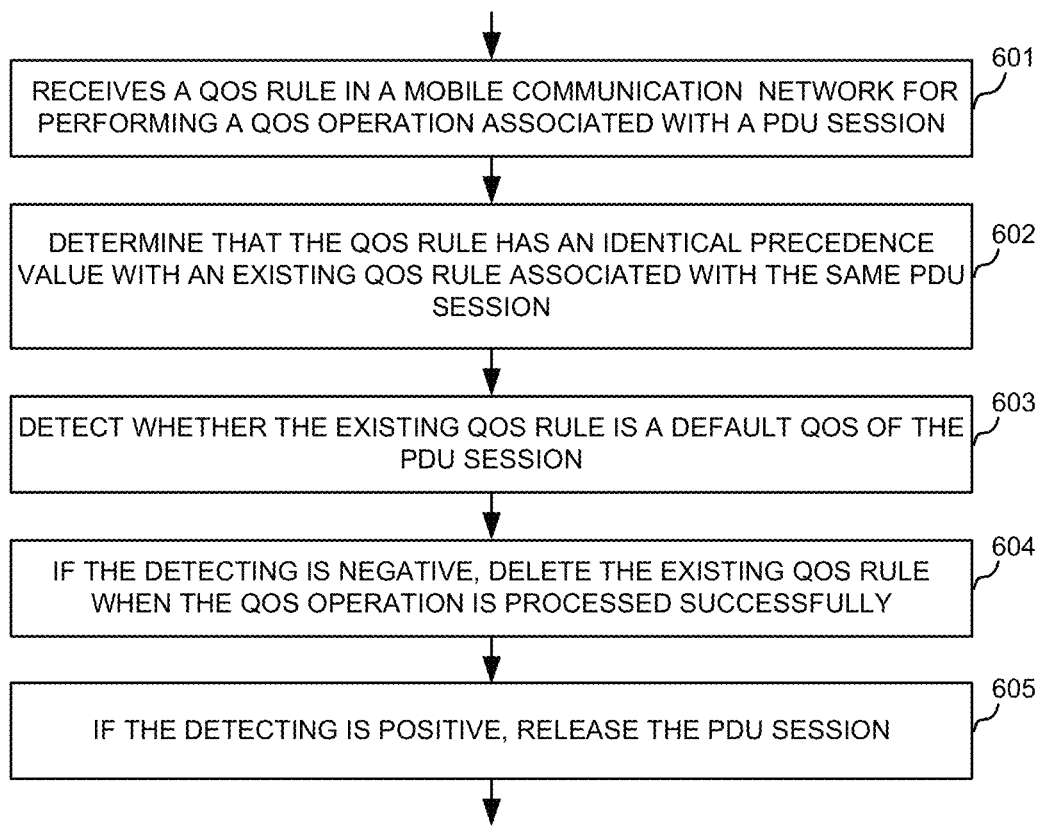
FIG. 6 is a flow chart of a method of QoS rule management handling semantic error in accordance with one novel aspect.

FIG. 6 is a flow chart of a method of QoS rule management handling semantic error in accordance with one novel aspect. In step 601, a UE receives a Quality of Service (QoS) rule in a mobile communication network for performing a QoS operation associated with a protocol data unit (PDU) session. In step 602, the UE determines that the QoS rule has an identical precedence value with an existing QoS rule associated with the same PDU session. In step 603, the UE detects whether the existing QoS rule is a default QoS rule of the PDU session. In step 604, if a detecting result is negative, then the UE deletes the existing QoS rule when the QoS operation is processed successfully. In step 605, if the detecting result is positive, then the UE releases the PDU session.

Figure 7:
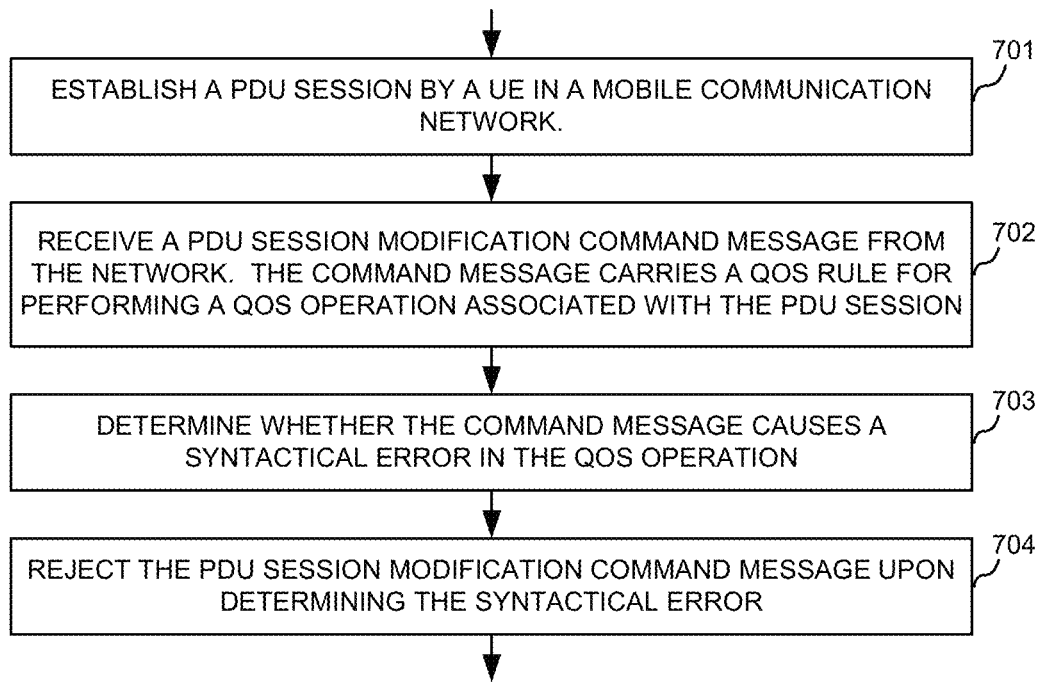
FIG. 7 is a flow chart of a method of QoS rule management handling syntactical error in accordance with one novel aspect.

FIG. 7 is a flow chart of a method of QoS rule management handling syntactical error in accordance with one novel aspect. In step 701, a UE establishes a protocol data unit (PDU) session in a mobile communication network. In step 702, the UE receives a PDU session modification command message from the network. The command message carries a Quality of Service (QoS) rule for performing a QoS operation associated with the PDU session. In step 703, the UE determines whether the command message causes a syntactical error in the QoS operation. In step 704, the UE rejects the PDU session modification command message upon determining the syntactical error. The syntactical error occurs when the QoS operation is a categorized operation as well as the QoS operation meets one of the following situations: an empty packet filter list is in the QoS rule, a non-empty packet filter list is in the QoS rule, and a packet filter to be deleted does not exist in the existing QoS rule.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
establishing a protocol data unit (PDU) session by a user equipment (UE) in a mobile communication network;
receiving a PDU session modification command message from the network, wherein the command message carries a Quality of Service (QoS) rule for performing a QoS operation associated with the PDU session;
determining whether the command message causes a syntactical error in the QoS operation; and
rejecting the PDU session modification command message upon determining the syntactical error occurs when the QoS operation is a categorized operation as well as the QoS operation meets one of the following situations: an empty packet filter list is in the QoS rule, a non-empty packet filter list is in the QoS rule, and a packet filter to be deleted does not exist in the existing QoS rule, wherein the UE rejects the PDU session modification command message with a 5G session management (5GSM) cause value indicating the syntactical error in the QoS operation.

2. The method of claim 1, wherein determining the syntactical error occurs comprises when the packet filter list in the QoS rule is empty, and the QoS operation is one of the categorized operations: create new QoS rule, modify existing QoS rule and add packet filters, modify existing QoS rule and replace packet filters, modify existing QoS rule and delete packet filters.

3. The method of claim 1, wherein determining the syntactical error occurs comprises when the packet filter list in the QoS rule is non-empty, and the QoS operation is one of the categorized operations: delete existing QoS rule, and modify existing QoS rule without modifying packet filters.

4. The method of claim 1, wherein determining the syntactical error occurs comprises when the QoS rule does not have the packet filters to be deleted, and the QoS operation is for UE to modify existing QoS rule and delete packet filters.

5. The method of claim 4, wherein the UE processes the QoS operation and considers the packet filters as successfully deleted.

6. A User Equipment (UE), comprising:
a protocol data unit (PDU) session handling circuit that establishes a PDU session in a mobile communication network;
a receiver that receives a PDU session modification command message from the network, wherein the command message carries a Quality of Service (QoS) rule for performing a QoS operation associated with the PDU session; and
a control circuit that determines whether the command message causes a syntactical error in the QoS operation; wherein
the PDU session handling circuit rejects the PDU session modification command message upon determining the syntactical error occurs when the QoS operation is a categorized operation as well as the QoS operation meets one of the following situations: an empty packet filter list is in the QoS rule, a non-empty packet filter list is in the QoS rule, and a packet filter to be deleted does not exist in the existing QoS rule, wherein the UE rejects the PDU session modification command message with a 5G session management (5GSM) cause value indicating the syntactical error in the QoS operation.

7. The UE of claim 6, wherein determining the syntactical error occurs comprises when the packet filter list in the QoS rule is empty, and the QoS operation is one of the categorized operations: create new QoS rule, modify existing QoS rule and add packet filters, modify existing QoS rule and replace packet filters, modify existing QoS rule and delete packet filters.

8. The UE of claim 6, wherein determining the syntactical error occurs comprises when the packet filter list in the QoS rule is non-empty, and the QoS operation is one of the categorized operations: delete existing QoS rule, and modify existing QoS rule without modifying packet filters.

9. The UE of claim 6, wherein determining the syntactical error occurs comprises when the QoS rule does not have the packet filters to be deleted, and the QoS operation is for UE to modify existing QoS rule and delete packet filters.

10. The UE of claim 9, wherein the UE processes the QoS operation and considers the packet filters as successfully deleted.

* * * * *